United States Patent
Patel et al.

(10) Patent No.: US 10,558,551 B2
(45) Date of Patent: Feb. 11, 2020

(54) RUNTIME EXPANSION OF TEST CASES

(71) Applicant: salesforce.com, inc., San Francisco, CA (US)

(72) Inventors: Ashish Patel, Fremont, CA (US); Tuhin Kanti Sharma, San Mateo, CA (US); Christopher Tammariello, San Mateo, CA (US); Michael Bartoli, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 50 days.

(21) Appl. No.: 15/685,980

(22) Filed: Aug. 24, 2017

(65) Prior Publication Data
US 2019/0065345 A1 Feb. 28, 2019

(51) Int. Cl.
*G06F 11/36* (2006.01)

(52) U.S. Cl.
CPC .................... *G06F 11/3612* (2013.01)

(58) Field of Classification Search
CPC .................................... G06F 11/3612
See application file for complete search history.

(56) References Cited

U.S. PATENT DOCUMENTS

| | | | | |
|---|---|---|---|---|
| 6,601,018 B1* | 7/2003 | Logan | ............... | G06F 11/3684 702/186 |
| 7,421,621 B1* | 9/2008 | Zambrana | ......... | G06F 11/3612 714/38.14 |
| 7,761,841 B1* | 7/2010 | Rexroad | ............ | G06F 11/3688 717/100 |
| 9,471,478 B1* | 10/2016 | Bhuiya | ............... | G06F 11/3692 |
| 10,282,281 B2* | 5/2019 | Mallya | ............... | G06F 11/3676 |
| 2005/0096864 A1* | 5/2005 | Bonilla | ............... | G06F 11/263 702/121 |
| 2008/0010542 A1* | 1/2008 | Yamamoto | .......... | G06F 11/3672 714/38.1 |
| 2009/0187892 A1* | 7/2009 | Ohi | ..................... | G06F 11/3684 717/126 |
| 2009/0204591 A1* | 8/2009 | Kaksonen | .......... | G06F 11/3684 |
| 2009/0300585 A1* | 12/2009 | Meenakshisundara | ..................... | G06F 11/3664 717/124 |
| 2009/0307468 A1* | 12/2009 | Choudhury | .......... | G06F 11/263 712/227 |
| 2010/0083233 A1* | 4/2010 | Vanoverberghe | ... | G06F 11/3612 717/126 |
| 2010/0281460 A1* | 11/2010 | Tillmann | ............ | G06F 11/3612 717/106 |

(Continued)

*Primary Examiner* — Ziaul A Chowdhury
(74) *Attorney, Agent, or Firm* — Wong & Rees LLP; Zhichong Gu

(57) ABSTRACT

Test case data is received for individual test cases. The test case data includes sets of test case specific elements. A test case base object is generated to represent a generic test case. The test case base object includes a set of test case specific properties. The test case base object is expanded into individual test case specific objects that represent the individual test cases. Each individual test case specific object is generated by setting the set of test case specific properties to a respective set of test case specific values as indicated in the sets of test case specific elements. The individual test case objects are used to execute the individual test cases against one or more systems under test.

18 Claims, 9 Drawing Sheets

(56) References Cited

U.S. PATENT DOCUMENTS

| | | | | |
|---|---|---|---|---|
| 2010/0287534 A1* | 11/2010 | Vangala | ............... | G06F 11/3612 |
| | | | | 717/124 |
| 2010/0332904 A1* | 12/2010 | Bloching | ............ | G06F 11/2294 |
| | | | | 714/32 |
| 2011/0208469 A1* | 8/2011 | Sheye | ................. | G06F 11/3684 |
| | | | | 702/123 |
| 2011/0258603 A1* | 10/2011 | Wisnovsky | .......... | G06F 11/3612 |
| | | | | 717/125 |
| 2013/0117611 A1* | 5/2013 | Chakraborty | ....... | G06F 11/3672 |
| | | | | 714/33 |
| 2014/0282433 A1* | 9/2014 | Eilam | ................. | G06F 11/3688 |
| | | | | 717/131 |
| 2015/0057961 A1* | 2/2015 | Montoya | ............. | G06F 11/2294 |
| | | | | 702/121 |
| 2015/0254171 A1* | 9/2015 | Harden | ............ | G06F 17/30563 |
| | | | | 717/124 |
| 2016/0357661 A1* | 12/2016 | Furman | ............... | G06F 11/3664 |
| 2018/0095866 A1* | 4/2018 | Narayanan | .......... | G06F 11/3684 |

* cited by examiner

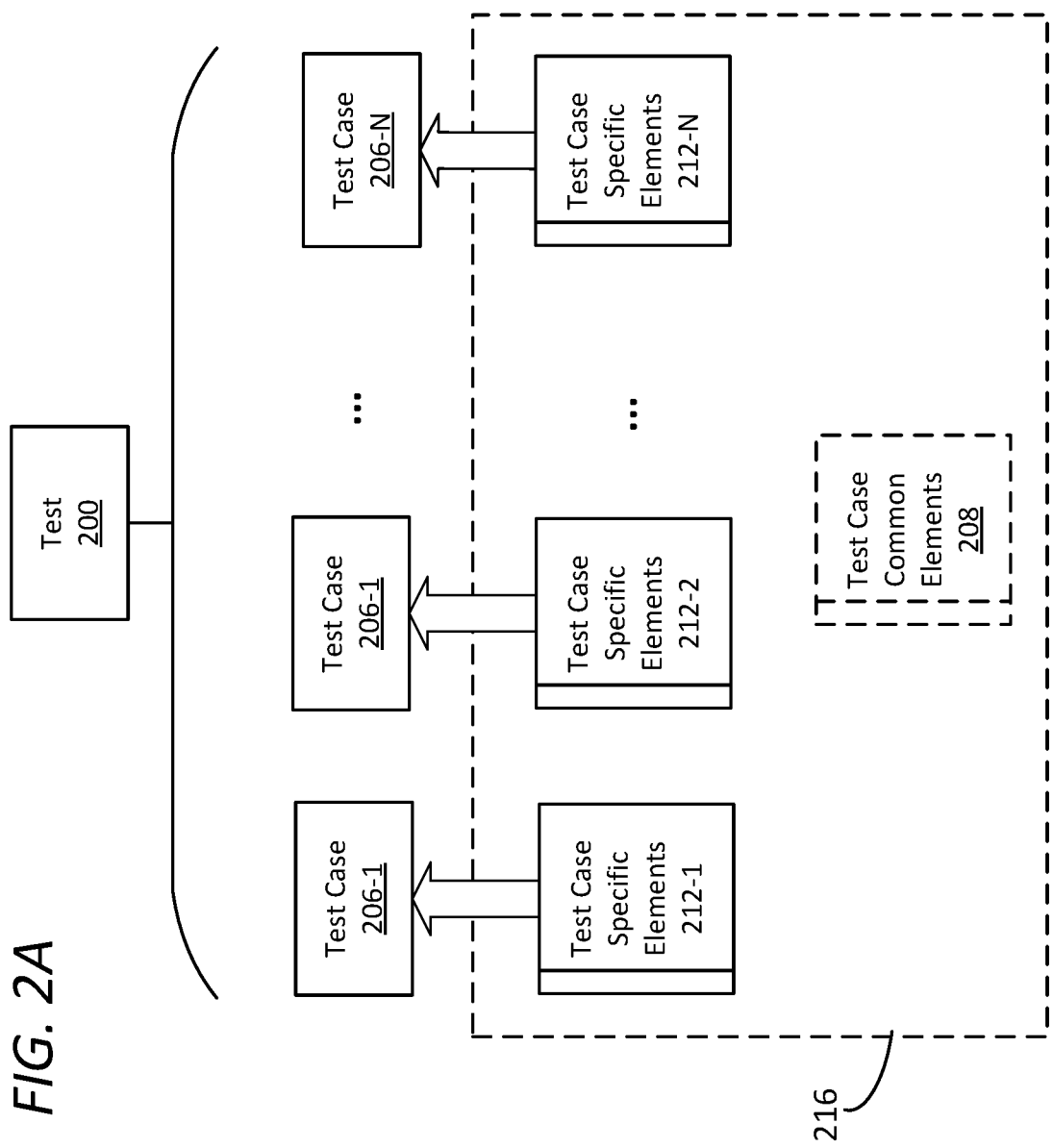

208, 212-1, 212-2, ... 212-N

```
"serverDomainName": "<service>.google.com",
"expectedReturnResponse": "200 OK",
"reacheableTimeLimit": "60 seconds",
"replaceableOverrides": [
{"<service>", "mail"},
{"<service>", "news"},
{"<service>", "finance"}
]
```

*FIG. 2C*

RUNTIME EXPANSION OF TEST CASES

TECHNICAL FIELD

The present invention relates generally to test execution, and in particular, to runtime expansion of test cases in test execution.

BACKGROUND

A computing system that processes massive volumes of transactions and interactions may comprise numerous software and hardware components distributed across a large number of computing nodes and networks. To verify that the system performs correctly and responsively, extensive and sophisticated testing need to be performed against some or all the components in the system regularly, on demand, or in development.

Typically, specific test code is written in various programming languages such as JAVA, C#, C++, etc., to support specific test cases against a system under test. If the system is developed by many developers and used by many users, the test code need to be designed, written and itself tested over and over again through tightly coupled cooperative and handholding efforts involving numerous people, organizations, and development teams. As the system evolves over time with new features, new components and new bug fixes, test code development efforts, preparing test data, coordinating different stakeholders in testing, and so forth, can consume significant personnel and non-personnel resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A through FIG. 2C illustrate example test case data used to generate test cases at runtime or in offline processing;

DESCRIPTION OF EXAMPLE EMBODIMENTS

Figure 1A:
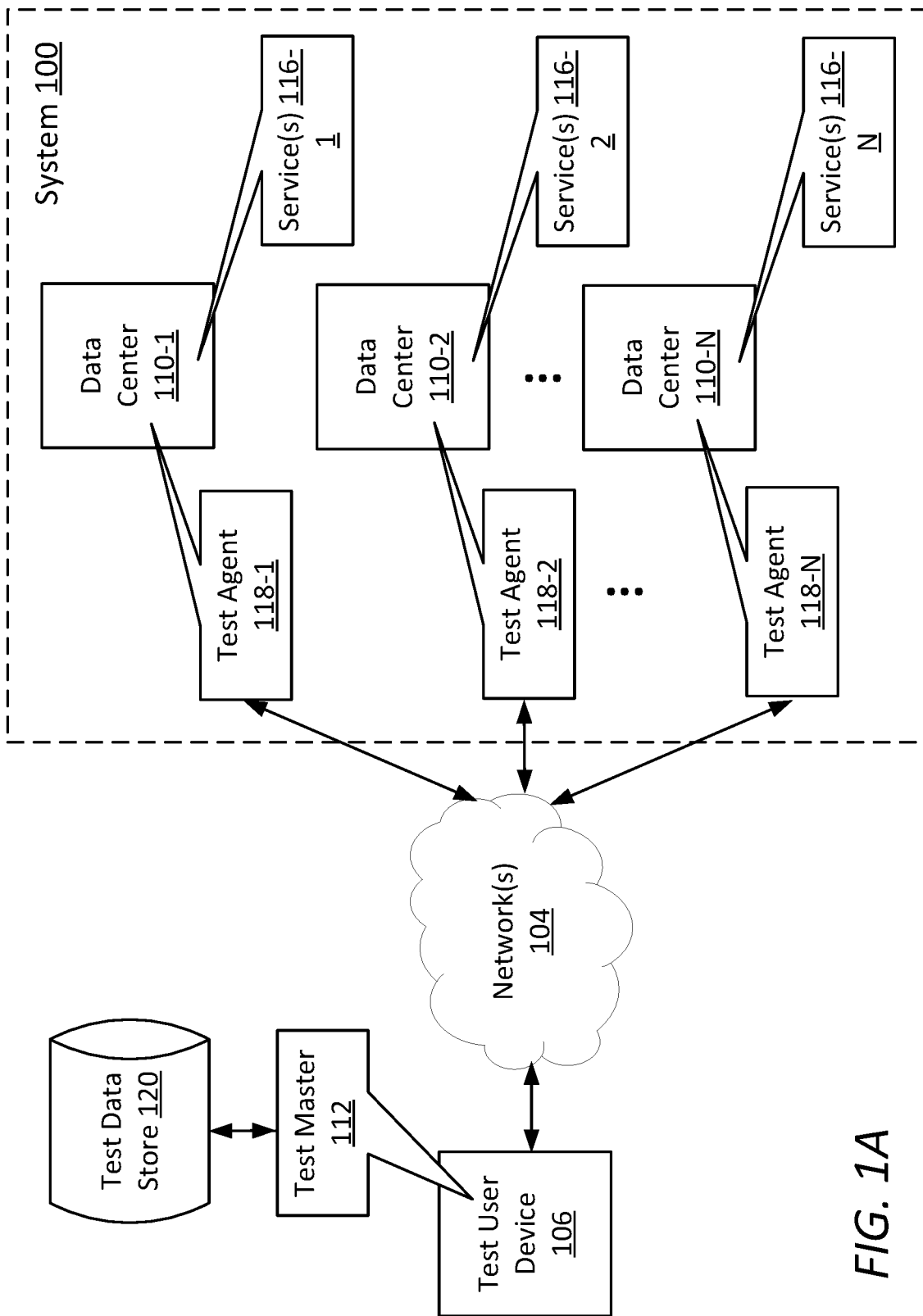
FIG. 1A illustrates an example stateless test execution framework comprising a test master and test agents.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
  2.0. Functional Overview
    2.1. Test Tools and Proxy Agents
    2.2. Stateless Text Execution Framework
    2.3. RESTful Endpoints
    2.4. Test Case Data
    2.5. Test Case Expander
    2.6. Generic Test Case and Specific Test Cases
    2.7. Testing Applications/Services at Multiple Endpoints/Servers
  3.0. Example Embodiments
  4.0 Implementation Mechanism—Hardware Overview
  5.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under some approaches, different test cases are created for monitoring or testing different applications/services with respective endpoints, even though the underlying applications/services may have the same or substantially similar test configurations, behaviors or characteristics.

Techniques as described herein can be used to implement a test case expansion mechanism under which a generic test case is expanded into many specifically targeted test cases against one or more systems under test based on a data file that identifies specific data elements used in the specifically targeted test cases. The test case expansion mechanism as described herein can be implemented as a part of a test execution framework to avoid writing customized test code that consumes significant resources to develop and maintain. In addition, the mechanism can be used in the test execution framework to test systems in development as well as in production. Any of the systems under test may be a complicated computing system such as a cloud-based computing system that delivers a wide range of application services through many different service endpoints and that supports massive volumes of concurrent and sequential transactions and interactions.

The test case expansion mechanism as described herein can be implemented in a system configuration that comprises a test master and one or more test agents. The test master and the one or more test agents may, but is not limited to, be deployed in a public cloud, in a private cloud, in a combination of one or more public clouds and one or more private clouds, and so forth.

Test case data for test cases such as those against a database system may be sent or submitted in the data elements by the test master, for example over an HTTP-based or non-HTTP-based communication mechanism, and forwarded to some or all of the test agents. Example test masters and test agents can be found in U.S. patent application Ser. No. 15/685,964, with an application title of "STATELESS SELF-SUFFICIENT TEST AGENTS" by Ashish Patel, Chris Tammariello, Michael Bartoli, Tuhin Kanti Sharma, and Vaishali Nandal, filed on Aug. 24, 2017, the entire contents of which are hereby incorporated by reference as if fully set forth herein.

The test case data can be developed/created with a data description language or a data interchange format such as JavaScript Object Notation (JSON), a XML file, a flat file database, etc., without any need to write test tool code for these test cases in a programming language such as JAVA, C#, C++, etc.

A test user can help create the test case data as defined in the data file. In some embodiments, the test user can interact with a test user interface of a test master to generate or modify the test case data without necessarily creating the data file by hand.

A generic test case as described herein can be represented by a test case base object. In some embodiments, the test case base object is generated by identifying commonality such as test case common properties, test case specific properties, common test checks, common test configurations, and so forth, among individual test cases.

As used herein, the term "test check" (or "test verification") refers to a verification of one or more of: an expected return code, an expected return message, an expected time limit for completing a test step or for receiving a response, some or all of expected test results associated with one or more test steps, etc. The term "test configuration" refers to one or more of: test operations to be performed, types of test operations to be performed, a specific order in test operations to be performed, messaging protocols, types of test data to be used in test operations, etc.

The test case common properties may be given the same keys and the same values applicable to all individual test cases. Some or all of the test case common properties may be populated with test case common elements included as a part of data elements in a request for executing a test that includes the individual test cases.

The test case base object with populated values for the test case common properties and unspecified or overridable values for the test case specific properties may be deeply cloned to generate individual test case specific objects for representing the individual test cases. As used herein, the term "deep cloning" may refer to that all properties and methods/APIs of a base object (e.g., a test case base object, etc.), including but not limited to the base class's default values, overridable values, set values, null values, placeholders, properties with values, properties without values, and so forth, is cloned into a non-base object (e.g., a test case specific object, etc.).

The test case specific properties in the individual test case specific objects may be populated with respective test case specific elements (or data values indicated therein) included as a part of a runtime request for executing a test that includes the individual test cases.

The individual test case specific objects as deeply cloned from the test case base object and as populated with the respective test case specific elements from the request for executing the test may be used to execute the individual test cases in the test. In some embodiments, test case executions may be effectuated by invoking test execution methods or test execution Application Programming Interface (API) calls supported or implemented in the test case base object with some or all of the test case common properties and the test case specific properties.

As a result, there is no need to write code for new applications/services or new instances of existing applications/services, if a generic test case has been specified/developed for an application/service that shares the same test checks and the same test configuration with the new applications/services or the new instances of existing applications/services.

Furthermore, in some embodiments, all the test case data needed for expanding the generic test case into the individual test cases can be captured in a single data file. Thus, changes or extensions of new or existing test cases can be made in a single place as represented by the single data file, obviating any need to make multiple changes to multiple files.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview 2.1 Stateless Text Execution Framework

FIG. 1A illustrates an example stateless test execution framework comprising a test master 112 and one or more test agents (e.g., 118-1, 118-2, 118-3, etc.). This framework can be used to run a wide variety of focused and/or extensive tests against software and/or hardware components in system 100. Example systems may include, but are not necessarily limited to: any of: multitenant data service systems, web-based systems, systems that support massive volumes of concurrent and/or sequential transactions and interactions, database systems, and so forth.

In some embodiments, system 100 may comprise one or more data centers 110-1, 110-2, . . . 110-N, where N is a positive integer. Each of data centers may comprise respective software and/or hardware components to be tested by the test cases. Data center 110-1 deploys first services 116-1; data center 110-2 deploys second services 116-2; data center 110-N deploys N-th services 116-N. Other software and/or hardware components, assets, and so forth, of system 100 may be hosted in or outside these data centers, and may serve as test target under techniques as described herein. As used herein, a service may refer to a service with an HTTP interface, or a service with a non-HTTP interface. Additionally, optionally or alternatively, services that serve as test targets under techniques as described herein may be deployed anywhere, not necessarily inside data centers.

As used herein, the term "software components" may refer to one or more of: services with HTTP interfaces, services with non-HTTP interfaces, mobile applications, web-based applications, browser-based applications, user interfaces, plug-ins, APIs, operating systems, software libraries, computer executable codes, related non-executable data, application software, system software, embedded software, device drivers, microcode, computer clustering software, server processes, web servers, backend servers, database servers, databases, and so forth. The term "hardware components" may refer to one or more of: CPUs, controllers, microprocessors, FPGAs, ASICs, ICs, network processors, firmware, chipsets, interconnects, buses, RF integrated chips, graphic processors, computer memory, fixed and removable storage media, peripherals, and so forth.

Under techniques as described herein, test master 112 and test agents (e.g., 118-1, 118-2 . . . , 118-N, etc.) operate within a stateless framework that is agnostic to specific network setups. The one or more computer networks 104 through which test master 112 and test agents (e.g., 118-1, 118-2 . . . , 118-N, etc.) communicate may refer to any combination of one or more of: the Internet; intranets, extranets, virtual private networks (VPNs), local area networks (LANs), wide area networks (WANs), wireless networks, wireline networks, client-server, mobile networks, public networks, carrier-class networks, access networks, enterprise networks, proprietary networks, or the like.

Test master 112 can be deployed at a test user device 106, which represents a computer device that may or may not be co-located with any of the test agents (e.g., 118-1, 118-2 . . . , 118-N, etc.). Example test user devices may include, but are not necessarily limited to only, any of: a computer server, a handheld computing device, a mobile device, a wearable device, a laptop computer, a work station, a desktop personal computer, a PDA, a cell phone, a tablet, a PC, or any device or any computing device capable of interfacing directly or indirectly to test agents as described herein for the purpose of running test cases against software and/or hardware components under test in system 100. In some embodiments, test master 112 may be deployed on any device which supports a JAVA virtual machine (JVM). Additionally, optionally or alternatively, test master 112 may be hosted on one or more server devices that host or provide one or more data repositories such as relational or non-relational databases for storing test related data. In some embodiments, test master 112 can be hosted on a web server and can be accessed through HTTP or REST endpoints.

The test agents (e.g., 118-1, 118-2 . . . , 118-N, etc.) can receive test execution requests from test master 112, and then execute tests as requested by the test execution requests in complete independence of test master 112. Final test statuses and related test results of the requested tests may be made available or sent to test master 112, for example, as responses to the test execution requests.

For example, to execute a specific test against specific software and/or hardware components under test in system 100, test master 112 retrieves test definition data and test data for the test from a test data store 120. Test master 112 can further identify a set of one or more candidate test agents that are configured to execute the test, for example based on agent configuration and status data retrieved from an accessible data store such as test data store 120. Example agent configuration and status data may include, but is not necessarily limited to only, any of: test capabilities of test agents in relation to the specific test, locations of test agents in relation to the specific test in relation to locations of the software and/or hardware components under test, etc.

Test master 112 can select any test agent in the set of candidate test agents to execute the test, and send a request for executing the test to the selected agent over one or more computer networks 104. The request for executing the test includes, but is not necessarily limited to only, any initial test data needed by the recipient test agent for scheduling and executing the test.

In response to receiving the request for executing the test, the test agent (e.g., 118-1, 118-2 . . . , 118-N, etc.) performs a series of operations to carry out the requested test. In some embodiments, the series of operation is performed by the test agent (e.g., 118-1, 118-2 . . . , 118-N, etc.) without further interactions between the test agent (e.g., 118-1, 118-2 . . . , 118-N, etc.) and test master 112 after the request for executing the test was received.

The series of operations performed by the test agent (e.g., 118-1, 118-2 . . . , 118-N, etc.) independently may include, but are not necessarily limited to only, one or more of: determining a set of test cases to be run in the test, determining a time schedule for executing each test case in the test, determining a complete set of test steps for each test case in the test, determining a complete set of test data used to initiate or execute the complete set of test steps for each such test case, executing the complete set of test steps for each such test case with the complete set of test data, generating a final test execution status for each such test case, causing the final test execution status and related test results for each such test case to be made available or returned to test master 112, and so forth.

Under the stateless test execution framework as described herein, once the request for the test is received by the test agent (e.g., 118-1, 118-2 . . . , 118-N, etc.), no coupling or interaction between the test agent (e.g., 118-1, 118-2 . . . , 118-N, etc.) and test master 112 is needed for the test agent (e.g., 118-1, 118-2 . . . , 118-N, etc.) to carry out executing the test. Even if test master 112 fails or otherwise becomes incommunicado with the test agent (e.g., 118-1, 118-2 . . . , 118-N, etc.), the test agent (e.g., 118-1, 118-2 . . . , 118-N, etc.) requested to perform the test can continue to schedule and execute all the test cases in the test, and carry out executing these test cases to their respective completions. When a new instance of test master 112 starts up or an existing instance of test master 112 recovers, test master 112 can send a new request to retrieve the final test execution status and the related test results for each test case in the test previously requested by a prior reincarnation of test master 112.

For the purpose of illustration only, FIG. 1A depicts a test agent for each data center. It should be noted, however, that in general, test agents may be deployed in same or different locations other than those implying a one-to-one relationship with data centers. In various embodiments, zero, one, or more test agents may be deployed at a data center. For example, a test agent pool comprising multiple test agents of similar capabilities may be deployed at a data center. Additionally, optionally or alternatively, another data center may be devoid of any locally deployed test agent. In some embodiments, a test agent at a data center may be used to test software and/or hardware components in system 100. In some embodiments, a test agent remote to a data center may be used to test software and/or hardware components in system 100. In some embodiments, test agents may be deployed at likely locations where potential users of system 100 are located so that functionality (or logic) and/or responsiveness can be tested with respect to certain software and/or hardware components in system 100.

2.2 RESTful Endpoints

Figure 1B:
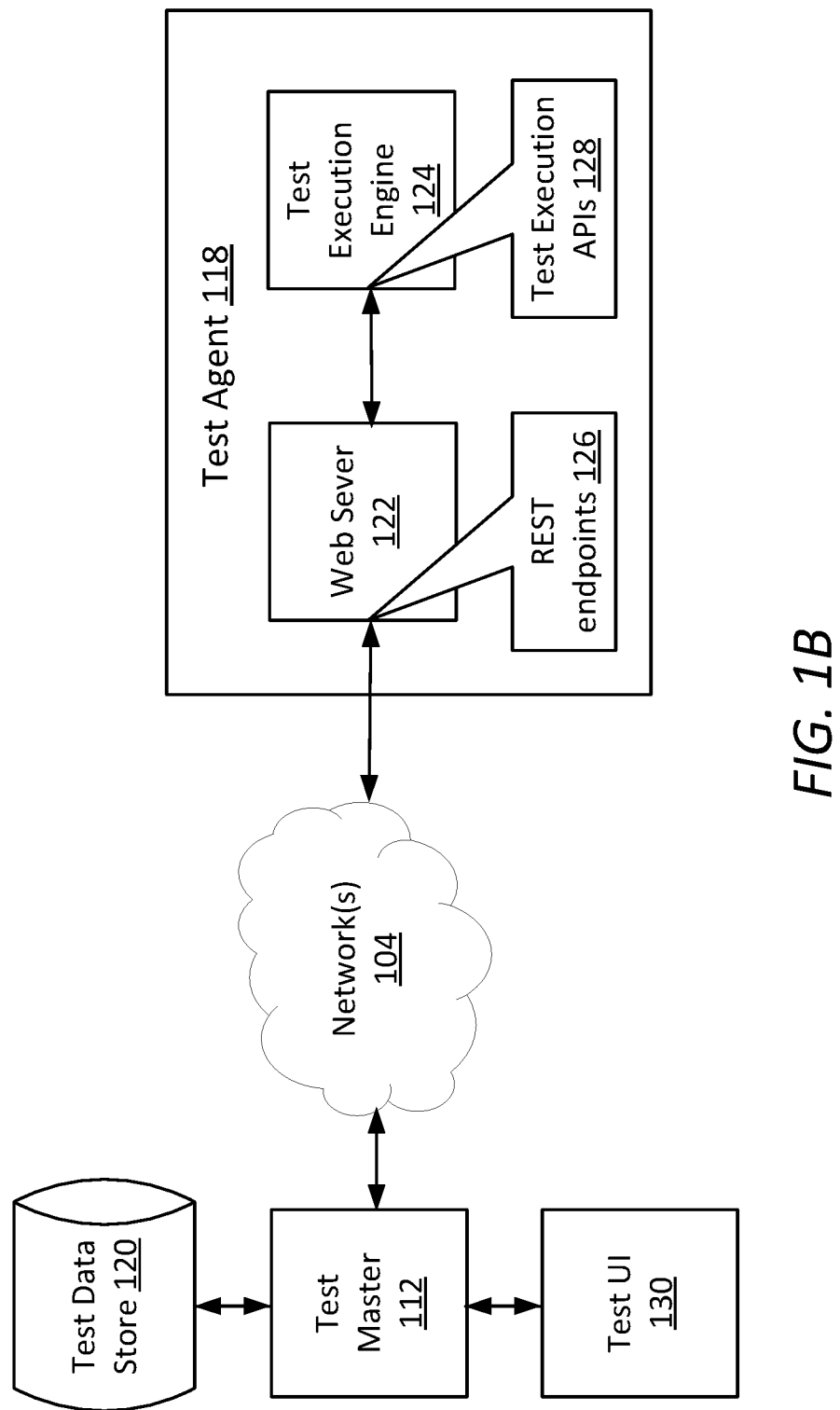
FIG. 1B illustrates an example test agent that interacts with test master for executing tests.

FIG. 1B illustrates an example test agent 118 that interacts with test master 112 for executing tests. As illustrated, test agent 118 comprises or implements a web server 122 and a test execution engine 124. Test execution engine 124 implements test execution functionality such as scheduling tests, executing tests, updating tests and test cases therein, reporting test execution statuses and results, and so forth. The test execution functionality implemented by the test execution engine 124 of test agent 118 may be exposed to web server 122 as one or more test execution Application Programming Interfaces (APIs) 128.

Test execution API calls 128 (e.g., implemented as HTTP-based RESTful APIs, etc.) exposed to web server 122 by test execution engine 124 may be indirectly exposed by web server 122 as HTTP-based endpoints/resources such as RESTful endpoints 126. These RESTful endpoints 126 are addressable by a web application or a web browser on any device directly or indirectly capable of establishing a web-based data connection with web server 122, including but not limited to: test master 112, another instance of test master 112 on a different device, and so forth.

Each of RESTful endpoints 126 may be addressable with an HTTP-based REST request including but not necessarily limited to only the following data items: a corresponding base Universal Resource Locator (URL) such as "https://txapi.force.com/resources/" that identifies a REST resources location for test execution; an internet media type that defines REST state transition data elements for test execution such as JSON, a XML file, a flat file database, and so forth; a standard HTTP method such as OPTIONS, GET, PUT, POST, and DELETE; etc.

In some embodiments, some or all of the RESTful endpoints may be publicly accessible. In some embodiments, some or all of the RESTful endpoints may be accessible by test master 112 through one or more private, proprietary, and/or specifically provisioned, data connections. In some embodiments, some or all of the RESTful endpoints may require authentication and/or authorization. One or more authentication and/or authorization mechanisms that can operate with HTTP or HTTP-based REST operations can be used before an API call can be successfully invoked indirectly by an HTTP request from test master 112 to web server 122. In some embodiments, some or all of the endpoints invoke API calls that execute tests accessing one or more of: test and/or production data owned by a service provider, test and/or production data owned by a user system of a service provider, data maintained at a specific data center or data store, data maintained at multiple data centers or data stores, and so forth.

At runtime, test master 112 may determine/select a RESTful (test execution) endpoint for scheduling a specific test to be executed by test agent 118. For instance, test master 112 may determine a set of data items to be included with an HTTP request such as the base URL of RESTful endpoints 126, a path (e.g., to be concatenated to the base URL, etc.) for the RESTful endpoint among the RESTful endpoints 126, REST state transition data elements (e.g., test definition data, test data, in JSON, in XML, in a flat file database format, etc.), a standard HTTP method of POST, and so forth.

Test master 112 generates an HTTP-based REST request based on a URL constructed from the base URL and the path, the REST state transition data elements (e.g., in JSON, in XML, in a flat file database format, etc.), the HTTP method, and so forth, and sends the HTTP-based REST request to web server 122 to cause web server 122 to invoke a call to a corresponding test execution API among test execution API 128 exposed to web server 122 by test execution engine 124.

In some embodiments, the HTTP-based REST request comprises test definition data that identifies the set of test cases, test steps in each test case in the set of test cases, test data to be used in each, some, or all of the test cases and/or the test steps in the test, and so forth. Some or all of the test definition data and the test data received as a part of the HTTP-based REST request from test master 112 may be passed to test execution engine 124.

The test may comprise a set of one or more test cases. For instance, a first test case in the test may be to execute one or more first test transactions and/or interactions with data center 110-1 of FIG. 1A; a second test case in the test may be to execute one or more second test transactions and/or interactions with data center 110-2 of FIG. 1A; a third test case in the test may be to execute one or more third test transactions and/or interactions with data center 110-1 of FIG. 1A.

In response to invoking the specific API call by web server 122, test agent 118-1, or test execution engine 124 therein, performs a series of operations to schedule and/or carry out the requested test, as previously discussed. In some embodiments, the series of operation is performed by the test agent (e.g., 118-1, 118-2 . . . , 118-N, etc.) without further interactions between the test agent (e.g., 118-1, 118-2 . . . , 118-N, etc.) and test master 112.

In some embodiments, a final test execution status and some or all of test results from executing the set of test cases of the test may be provided by test execution engine 124 as return code or return data in the call to the corresponding test execution API to web server 122. Web server 122 may cache/store the final test execution status and some or all of the test results as REST resources that can be accessed or retrieved through HTTP-based REST GET operations from the REST resources location of web server 122. Some or all of the REST resources cached/stored by web server 122, including but not necessarily limited to only the final test execution status and the test results, may be returned in an HTTP-based REST response (or simply HTTP response) to test master 112 in response to the HTTP-based REST request for the test.

If test master 112 fails or otherwise becomes incommunicado with test agent 118, the HTTP-based REST response sent by test agent 118, or web server 122 operating in conjunction with test agent 118, may fail to reach test master 112. In some embodiments, a new instance or a recovered instance of test master 112 or another test master (e.g., from the same test user device, from a different test user device, etc.) may retrieve information from HTTP-based REST responses by querying the REST resources cached/stored by web server 122 with HTTP-based REST request with GET methods/operations.

For example, the test master 112, after being restored or restarted, can issue a new HTTP-based REST request to receive a new HTTP-based REST response that comprises information in the failed HTTP-based REST response. For instance, the new HTTP-based REST request may be generated based on the base URL of RESTful endpoints 126, the same path (e.g., to be concatenated to the base URL, etc.) for the specific RESTful endpoint among the RESTful endpoints 126 that was used to request executing the test, a standard HTTP method of GET, and so forth.

2.3 Test Definition Data and Test Data

In some embodiments, test execution engine 124 may be implemented with computer code that performs test transactions and test interactions based on the test definition data and the test data forwarded by web server 122 in the API call invoked by web server 122. Example test transactions and test interactions may include, but are not necessarily limited to only, any of: transactions and interactions using production data (e.g., actual data generated by users, etc.), transactions and interactions using test data (e.g., synthesized data to cover special or general data values or special or general application logic, etc.), transactions and interactions using software and hardware components in a production environment, transactions and interactions using software and hardware components in a development environment, transactions and interactions involving user input, transactions and interactions between backend servers, any combination of the foregoing, and so forth.

Test definition data and test data can be used to enable a test agent to execute a test independent of a test master while the test is being executed. For example, test execution engine 124 may be used to execute one or more test cases that comprise test transactions and test interactions that simulate transactions and interactions supported by user applications that run on user systems and that are used by users to access the subscribed services. Data representing user input in the test may be provided as a part of the test data originally in REST data elements (e.g., in JSON, in XML, in a flat file database format, etc.) and forwarded in the API call to test execution engine 124. The REST data elements as described herein can be used to include complete replications of view forms, which might be otherwise entered by a test user by hand under other approaches. Thus, based on the complete replications of the view forms (e.g., with synthesized data designed to test specific value range or specific logic of system 100, etc.), the test execution engine 124 can store the complete replication of the view forms in memory after the HTTP request causes a corresponding test execution API to be invoked (or called), and execute test steps without going back to test master 112 for additional user input for the view forms.

To simulate the transactions and interactions comprising dependency relationships, the test definition data may identify a set of dependent and/or independent test steps for each test case to be run in the test. The test definition data may identify specific relationships between and/or among the test steps in terms of timing, data, and other dependencies.

In executing a test case, based on the test definition data and the test data, test execution engine 124 guides the test case through relatively controlled test execution paths that purposefully exercise specific logic under test that is supported or implemented by one or more software and/or hardware components in system 100.

For example, test execution engine 124 may perform a first test step of a test case to interact with a set of specific software and/or hardware components under test in system 100 to execute a specific API call implemented or performed by the specific software and/or hardware component(s) under test with specific test data portions received in the test data or generated in prior dependent test steps (prior to the first step). The specific software and/or hardware components under test may return a status code and other related information in the specific API call. Test execution engine 124 may analyze the status code and return information, and perform a second test step of the test case to interact with a new set of specific software and/or hardware components under test in system 100 to execute a new specific application programming interface (API) call with new specific test data portions received in the test data or generated in prior dependent test steps (prior to the second step). Thus, while executing the test case, for the purpose of guiding the test case through the predesignated test execution paths, test execution engine 124 can maintain test execution state information in relation to the test case independent of test master 112.

2.4 Test Case Data

FIG. 2A illustrates example test case data 216 that can be used to generate test cases at runtime or in offline processing. Under techniques as described herein, test cases involving diverse types of tests and diverse types of test subjects can be generated based on test case data 216 developed/created in a data file, without any need to write test tool code for these test cases in a programming language such as JAVA, C#, C++, etc. The data file may be, without limitation, a human readable file, a binary data file, etc.

In some embodiments, test case data 216 comprises (e.g., constitutes, etc.) test definition data and test data for a test or test cases therein, and is defined/specified with a data description language or a data interchange format including but not limited to JavaScript Object Notation (JSON), a XML file, a flat file database, etc. A test user can interact with a test user interface (e.g., 130 of FIG. 1B, etc.) of a test master to generate, update and/or delete the test cases (as specified/defined in the test definition data) and the test data in test case data 216, instead of or in addition to directly operating the data file comprising test case data 216 that specifies or defines the test cases and the test data.

A test case as described herein is (e.g., fully, completely, together with a generic test case, etc.) specified and defined in portions of test case data 216 that are related to the test case. Test steps in the test case can use the test data in test case data 216 to generate intermediate test data as needed. This allows a test execution engine as described herein to execute autonomously (e.g., with respect to the test master, etc.), including but not limited to, execute each test step of the test case and generate any intermediate data needed to carry out each test step of the test case, without further interacting with a test master that made the original request for executing the test case while the test case is being executed by the test execution engine. More specifically, the portions of test case data 216 as related to the test case represent test execution metadata used in a data-driven message-driven test execution model to (e.g., fully, completely, etc.) control workflows of test execution at runtime for the test case and the test steps therein. Example test execution models can be found in U.S. patent application Ser. No. 15/686,005, with an application title of "CONTROLLING EXECUTIONS OF SYNCHRONOUS AND/OR NON-SYNCHRONOUS OPERATIONS WITH ASYNCHRONOUS MESSAGES" by Chris Tammariello, Ashish Patel, Tuhin Kanti Sharma, and Michael Bartoli, filed on Aug. 24, 2017, the entire contents of which are hereby incorporated by reference as if fully set forth herein.

Example test cases may include, but are not necessarily limited to only, synthetic web transactions against endpoints of web-based applications or services in order to measure and assess health and performance of the applications or services. In some embodiments, some or all of the synthetic web transactions can be developed and curated by test users who own the applications or services and would like to have a particular level of monitoring for their applications or services.

In some embodiments, test case data 216 comprises a set of test case common elements 208 and one or more sets of test case specific elements 212-1, 212-2, ... 212-N, where N is a positive integer no less than one (1).

Test case data 216 may be used to replace or populate values for test case specific properties of a test case base object when expanding the test case base object into individual test cases. While the test case base object represents a generic test case, each of the individual test cases represents a respective test case in a set of one or more test cases 206-1, 206-2, ... 206-N in a test 200.

Additionally, optionally or alternatively, when the set of test case common elements is available in the test case data 216, the set of test case common elements can be used to replace or populate values for some or all of test case common properties of the test case base object. Each set of test case specific elements in the one or more sets of test case specific elements 212-1, 212-2, ... 212-N can be used to replace or populate values for a respective set of test case specific properties of a respective test case specific object in the individual test case specific objects.

A test case, such as a synthetic web transaction and so forth, may comprise a set of one or more individual test steps. Some or all of the individual test steps in the test case may be executed in any order. Some or all of the individual test steps in the test case may need to be executed in a sequential execution order (or in a sequential execution chain). Test steps that need to be sequentially executed may convey their respective test step execution states including some or all of data in the test steps (e.g., received responses to requests made in a synthetic web transaction, etc.) to other test steps down in the sequential order. Test steps collectively may be used to assess an overall test execution state (e.g., via a final test case execution status, etc.) of services or applications under test.

In some embodiments, some or all of the test case data 216 for the test cases as described herein may be accompanied with individual timing information (or individual time constraints). Example individual timing information may include individual allocated time durations (e.g., one (1) minute for the first test case in the test, five (5) minutes for the second test case, to be executed at the one-minute mark, to be executed at the five-minute mark, etc.) for respective test cases to complete, specific individual start times for respective test cases to start, specific individual end times for respective test cases to end, and so forth. The individual timing information may be used to schedule the test cases and determined whether any of these test cases has failed by timeout (or exceeding the allocated time durations; or ending after the specified ending times) or by any other reason.

In some embodiments, some or all of test steps in a test case may be accompanied with individual timing information in test definition data and/or test data (e.g., test case data 216, etc.) for the test case. Example individual timing information may include individual allocated time durations (e.g., ten (10) second for the first test step in the first test case, fifteen (15) seconds for the second test step in the third test case, etc.) for respective test steps to complete, specific individual start times for respective test steps to start, specific individual end times for respective test steps to end, and so forth. The individual timing information may be used to schedule the test steps and determined whether any of these test steps has failed by timeout or by any other reason (or exceeding the allocated time durations; or ending after the specified ending times).

The set of test case common elements 208 and the sets of test case specific elements 212-1, 212-2, . . . 212-N in test case data 216 may be represented, without limitation, key-value pairs such as in JSON, markup tags such as in XML, data values in flat file database formats, and so forth. In some embodiments, the test execution engine of the test agent may, but is not limited to, run in JAVA virtual machine (JVM).

Figure 2B:
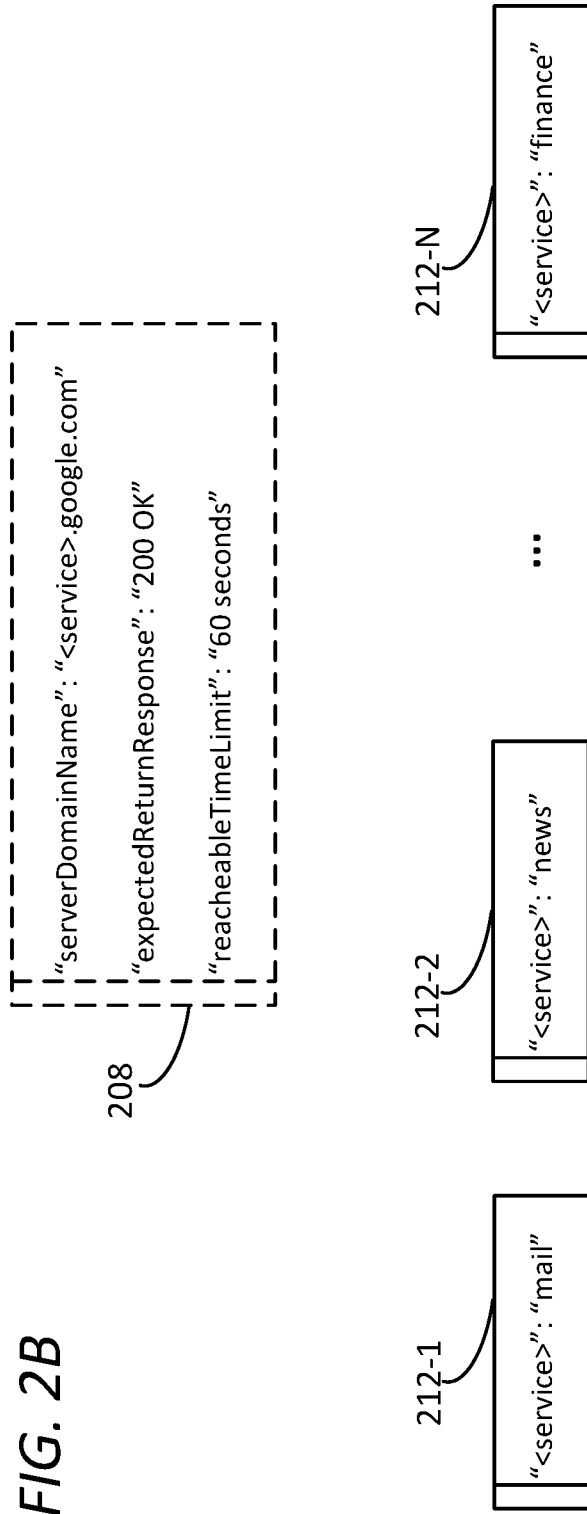

FIG. 2B illustrates an example set of test case common elements (e.g., 208, etc.) and one or more sets of test case specific elements (e.g., 212-1, 212-2, . . . , 212-N, etc.). The set of test case common elements 208 comprises a key-value pair of a key "serverDomainName" and a value "<service>.google.com", a key-value pair of a key "expectedReturnResponse" and a value "200 OK," a key-value pair of a key "reachableTimeLimit" and a value "60 seconds," etc. A first set of test case specific elements 212-1 comprises a key-value pair of a key "service" and a value "mail", etc. A second set of test case specific elements 212-2 comprises a key-value pair of a key "service" and a value "finance", etc. A third set of test case specific elements 212-3 comprises a key-value pair of a key "service" and a value "sports", etc.

2.5 Test Case Expander

A generic test case can be expanded into multiple test case specific objects that represent multiple individual test cases against multiple applications/services at runtime and/or in offline processing.

Figure 3A:
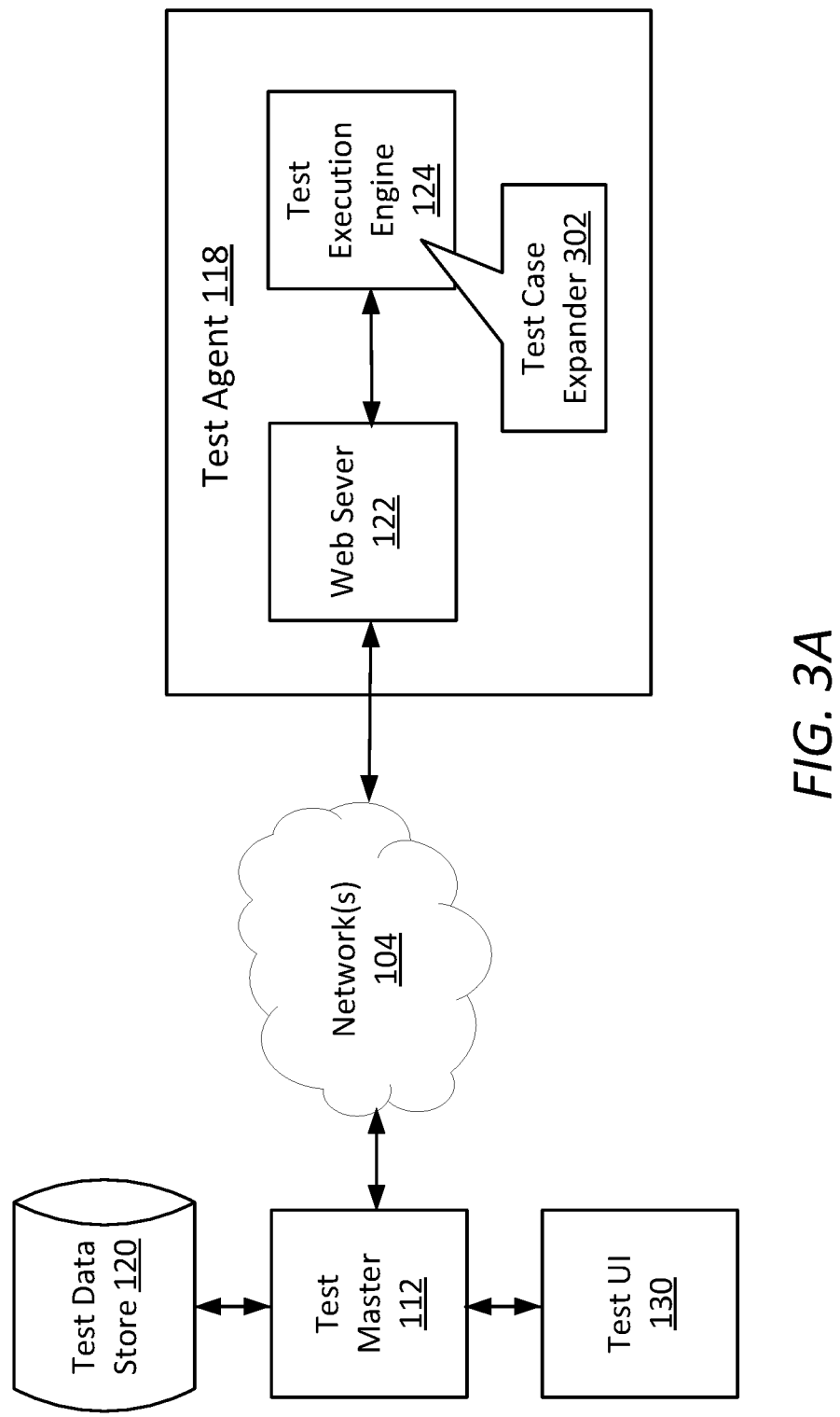
FIG. 3A illustrates an example test case expander.

FIG. 3A illustrates an example test case expander 302. In some embodiments, test case expander 302 can be implemented in a test execution engine (e.g., 124, etc.) of a test agent (e.g., 118, etc.) to expand a generic test case into a set of one or more test cases (e.g., 206-1, 206-2, . . . 206-N, etc.) in a test (e.g., 200, etc.).

In some embodiments, test case data 216 may be generated and/or stored in a test data store (e.g., 120, etc.) by a test user, by test master 112 interacting with a test user, and so forth. Test master 112 receives/retrieves test case data 216 from the test user and/or from test data store 120, and includes test case data 216 in the request for executing test 200, and sends the request for executing test 200 to test agent (e.g., 118, etc.) by way of web server 122.

Test case data 216 may be passed by test master 112 to test agent 118 in payloads (e.g., REST data elements, JSON key-value pairs, a flat file database, etc.) of the request for executing test 200 that is addressed to a specific endpoint at web server 122. Web server 122 in turn invokes a test execution API corresponding to the specific endpoint and forwarded test case data 216 to test execution engine 124 of test agent 118 in input data/parameters in the test execution API call.

In response to receiving test case data 216, test execution engine 124 delegates to test case expander 302 to use the set of test case common elements in test case data 216 to replace or populate values for some or all of test case common properties in a test case base object that represents the generic test case.

Test case expander 302 expands the test case base object into a set of one or more test case specific objects for representing the set of one or more test cases 206-1, 206-2, . . . 206-N, etc., in test 200. The set of one or more test case specific object may be generated from the test case base object by deep cloning or by inheritance.

Test case expander 302 uses each set of test case specific elements to replace or populate values for a respective set of test case specific properties in a respective test case specific object in the test case specific objects.

Once test case expander 302 finishes populating the values in the set of test case specific objects, test execution engine 124 may schedule/execute the set of one or more test cases 206-1, 206-2, . . . 206-N with the set of one or more test case specific objects, and cause final test case statuses of these test cases to be available to test master 112 by way of web server 122, for example as web-based resources (e.g., REST resources, etc.).

Additionally, optionally or alternatively, in some embodiments, after a test case specific object for a specific test case in the set of one or more test cases 206-1, 206-2, . . . 206-N is generated by test case expander 302, the test case specific object may be partly or in whole cached in memory until the test case is finished executing.

2.6 Generic Test Case and Specific Test Cases

Under techniques as described herein, instead of developing different test cases for different applications/services that share the same checks and the same test configuration, a (e.g., single, etc.) generic test case is developed for all these applications/services. The generic test case may or may not be directly used to test a specific application/ service. In some embodiments, the generic test case can be used to generate, or can be expanded into, specific test cases for the various applications/services that share the same checks and the same test configuration.

In some embodiments, the generic test case for the applications/services is represented by a single test case base object. As used herein, the term "test case base object" refers to a set of computer code units (e.g., an object, a class, etc.) that encapsulate a plurality of test case properties such as a set of zero or more test case common properties, a set of one or more test case specific properties, and so forth; in some embodiments, the test base object also implements at least one test case execution method based on the same checks and the same configuration shared among all the applications/services.

The test case base object may be generated/defined (1) by identifying, from the applications/services, the set of zero or more test case common properties that are common to all the applications/services, (2) by identifying, from the applications/services, the set of one or more test case specific properties that may vary among the applications/services, and (3) by implementing the same test checks and the same test configuration in one or more test case execution methods that make use of values of the test case common properties and the test case specific properties.

Figure 3B:
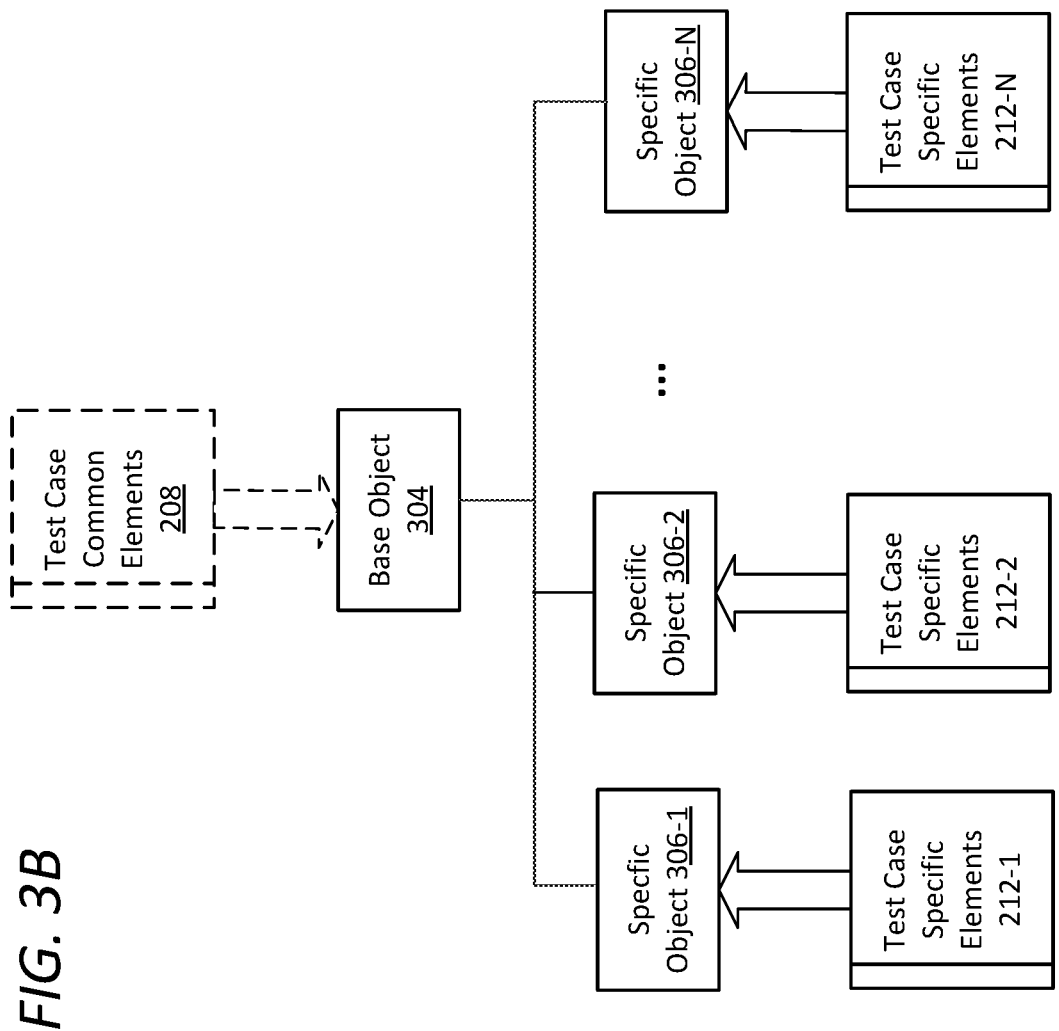
FIG. 3B illustrates example test case generic and specific objects.

In some embodiments, values for some or all of the test case common properties in the test case base object may be directly (e.g., hardcoded, etc.) or indirectly (e.g., from a parameter file, etc.) coded/implemented into the test case base object. In some embodiments, as illustrated in FIG. 3B, values of some or all test case common properties in the test case base object (e.g., 304, etc.) may be dynamically set for all the applications/services based on a set of test case common elements (e.g., 208, etc.) that is passed in a request for executing a test against the applications/services. Additionally, optionally or alternatively, values of some or all test case common properties in the test case base object may be stored/cached for the applications/services once these values are determined or received.

In some embodiments, an individual test case for an individual application/service among the applications/services is represented by an individual test case specific object (e.g., 306-1, 306-2, . . . 306-N as illustrated in FIG. 3B, etc.). In some embodiments, the individual test case specific object may be created/generated by deep cloning the test case base object. As a result, the individual test case base object inherits or clones the plurality of test case properties (including any default values, set values, and unspecified values therefor) and the test case execution method that is implemented based on the same checks and the same configuration shared among all the applications/services.

In some embodiments, as cloned, the individual test case specific object comprises the set of test case common properties that have already been set with determined values applicable to all the applications/services. However, as cloned, the individual test case specific object comprises the set of test case specific properties at least one of which is either unspecified or has a default or overridable value. In some embodiments, values of some or all test case specific properties in the individual test case specific object may be dynamically set for the specific application/service based on a set of test case specific elements that is passed in the request for executing the test against the applications/services that include the specific application/service. Additionally, optionally or alternatively, values of some or all test case specific properties in the individual test case specific object may be stored/cached for the specific application/service once these values are determined or received.

Different applications/services among the application/service may be represented by different individual test case specific objects. Each of the different individual test case specific objects can be cloned or other inherited from the test case base object the plurality of test case properties and the test case execution method(s) or API(s) that implement the same test checks and the same test configuration. Each of the different individual test case specific objects comprises the set of test case common properties that have already been set with determined values applicable to all the applications/services. As cloned, each such test case specific object comprises the set of test case specific properties at least one of which is either unspecified or has a default or overridable value. Values of some or all test case specific properties in each such test case specific object may be dynamically set for a respective application/service based on a respective set of test case specific elements that is passed in the request for executing the test against the applications/services that include the respective application/service. Additionally, optionally or alternatively, values of some or all test case specific properties in each such test case specific object may be stored/cached for the respective application/service once these values are determined or received.

As used herein, a test case element such as a test case common element or a test case specific element may be represented, without limitation, by a key-value pair. The applications/services that share a test case common element have the same key in a key-value pair representing the test case common element, as well as have the same value in the key-value pair. The applications/services may have the same key in a key-value pair representing a test case specific element but may or may not have the same value in the key-value pair.

2.7. Testing Applications/Services at Multiple Endpoints/Servers

By way of example but not limitation, test case specific objects as expanded from a test case base object that represents a generic test case can be generated and used to execute individual test cases against multiple applications/services of a service provider such as one associated with a domain name of "<service>.google.com". The applications/services may include, but are not necessarily limited to only, a "mail" application/service, a "news" application/service, a "finance" application/service, and so forth. These applications/services may be accessible at different endpoints, such as "mail.google.com", "news.google.com", "finance.google.com", and so forth.

Under techniques as described herein, a test user may create a single generic test case that can be expanded into individual test cases for all the applications/services of the service provider, even if the different endpoints, different web servers, different web-based applications/services, and different computing nodes, and so forth, are used to support these different applications/services. These individual test cases may constitute a test for checking individual health statuses of these applications/services.

The single generic test case may be represented by a test case base object that is generated by identifying commonality and non-commonality among the different applications/services.

For example, the commonality of the applications/services in the test for checking health statuses may be identified by the test user as follows: a common part of an URL such as ".google.com"; a common expected return code "200 OK"; a common time limit of 60 seconds; the same test configuration of sending an HTTP request to an endpoint as represented by the URL and obtaining an HTTP response in return; the same test check of whether the response includes the common expected return code "200 OK"; and so forth.

The non-commonality among the applications/services in the test may be identified by the test user as follows: a non-common part of the URL such as "mail", "news", "finance", etc.; and so forth.

In the present example, a single test case base object can be created to represent the single generic test case that is to be expanded into the multiple individual test cases for the multiple applications/services at runtime or in offline processing.

The single test case base object may be implemented with a set of test case common properties, a set of test case specific properties, and one or more test execution APIs or methods for carrying out test case executions of checking health statuses of the applications/services. The set of test case common properties may comprise, without limitation, a first key-value pair with a key "commonURLPart" and a value of ".google.com", a second key-value pair with a key "expectedResponse" and a value of "200 OK," a third key-value pair with a key "withinTimeLimit" and a value of "60 seconds," and so forth. The set of test case specific properties may comprise, without limitation, a fourth key-value pair with a key "nonCommonURLPart" and an unspecified, default and/or overridable value, and so forth. The one or more test execution APIs or method for carrying out test case executions of checking health statuses of the applications/services may include a test execution API or method that implements the same test configuration of sending an HTTP request to an endpoint as represented by the URL and obtaining an HTTP response in return and the same test check of whether the response includes the common expected return code "200 OK."

To expand the single generic test case into the multiple individual test cases for the multiple applications/services at runtime or in offline processing, multiple test case specific objects that represent the multiple individual test cases may be generated by deep cloning or otherwise inhering the single test case base object. The set of test case specific properties in each of the test case specific objects may be set with a respective set of test case specific elements that are passed in a request for executing the test for checking the health statuses of the applications/services.

In the present example, the request may comprise three sets of test case specific elements respectively corresponding to the three applications/services: "mail", "news" and "finance". A first set of test case specific elements in the three sets of test case specific elements in the request may comprise, without limitation, a key-value pair of the key "nonCommonURLPart" and a first value of "mail". A second set of test case specific elements in the three sets of test case specific elements in the request may comprise, without limitation, a key-value pair of the key "nonCommonURLPart" and a second value of "news". A third set of test case specific elements in the three sets of test case specific elements in the request may comprise, without limitation, a key-value pair of the key "nonCommonURLPart" and a third value of "finance".

This data-driven approach of expanding a generic test case into specific test cases allows a test user to create a single test case base object to represent the single generic test case. Test case specific elements, and even some or all of test case common elements, can be passed in a request for the test from a test master. Additionally, optionally or alternatively, these test case specific and/or common elements passed in the request can be formatted/represented in JSON, in XML, in flat file database formats, etc. For instance, the values of the key "nonCommonURLPart" in the previous example may be passed efficiently in the request as an array ("mail", "news", "finance") in JSON formatted data elements accompanying an HTTP-based request for executing the test. These array values can then be respectively used to populate or set values for the set of test case specific elements in the test case specific objects.

FIG. 2C illustrates an example JSON file that includes test case common elements 208 and test case specific elements 212-1, 212-2, . . . 212-N. The test case specific elements 212-1, 212-2, . . . 212-N are passed as an array named "replaceableOverrides" in the JSON file. In some embodiments, the test case base class can set or initialize the "service" field (or a test case specific property with "service" as the property key or name) to a default value (e.g., "www", etc.), which may be a correct value for a significant number of test cases such as a majority or a plurality of test cases. The value for the "service" field (denoted as "<service>") can then be overridden at runtime by values (e.g., "mail", "news", "finance", etc.) passed in as "replaceableOverrides" values from the JSON file that is included as data elements of a HTTP-based REST request for executing the test.

Under techniques as described herein, there is no need to write an individual test case for each endpoint associated with an application/service. Applications/services similar to the application/service and/or instances of the application/service can be tested with test cases generated from a single generic test case without a user writing or repeating individual test execution logic for these applications/services or the instances of the application/service.

The same test checks against these endpoints such as the expected "200 OK" responses and within an expected time limit of 60 seconds can be automatically cloned or reused in the individual test cases. Thus, for all the applications/services that share the same test checks and the same test configuration, the test execution API or method is implemented (e.g., only, etc.) once. Thereafter, all endpoints associated with the similar applications/services or the instances of the application/service can be tested with the same test configuration using test cases automatically cloned or generated from the generic test case.

In some embodiment, the test execution API or method implemented in the test case base object may comprise placeholders or fields in expressions such as URLs. These placeholders or fields can be replaced as regular expressions (or "regex") without code change at runtime or in offline processing when proper values for the placeholders or fields are received in the request for the test. As a result, there is no need to rewrite the test execution API or method for individual applications/services for which the test case base object has been created. A replacement of a placeholder or field, for example in a string representing the URL, may happen at runtime, thereby enabling a corresponding test case to use the most current version of the value for the placeholder or field and reducing or obviating any need to reconfigure or rewrite code for test cases with the latest values.

In some embodiments, one or more utility classes may be implemented to help expanding a test case base object as described herein into test case specific objects. These utility classes can be used for a variety of operational scenarios. For instance, a first utility class may be implemented to perform deep cloning of the test case base object for each individual test case that is to be expanded, for example at test execution time or before. A second utility class may be implemented to make replacements of placeholders or fields. In embodiments in which JAVA is used to implement objects/classes as described herein, some or all of test case properties (e.g., test case specific properties, test case common properties, etc.) may be represented as JAVA beans, whose values can be get or set through JAVA BeanWrapper that provide a generic way to set or replace values of key-value pairs that represent the test case properties. Additionally, optionally or alternatively, keys (or names) for some or all of the test case properties (e.g., test case specific properties, test case common properties, etc.) may be represented as JAVA beans, and may be get or set through JAVA BeanWrapper that provide a generic way to set or replace keys (or names) of key-value pairs that represent the test case properties. If new test case properties (or fields) are added, no new code need to be rewritten to set or replace keys or values of these new properties (or fields).

Under techniques as described herein, test case specific properties in test case specific objects generated from a test case base object can be automatically set or replaced before test cases represented by the test case specific objects are executed. In addition, the test cases can be executed by invoking test execution API calls or methods implemented in the test case base object and cloned by the test case specific objects. This provides a test user a capability to write or implement code for a single test case base object that ends up with or is expanded into multiple test case specific objects for executing individual test cases against multiple applications/services, even if these applications/services span across multiple servers.

In some embodiments, the test case base object that is to be expanded into the multiple individual test cases may be implemented in a test agent or a test execution engine thereof. Multiple sets of test case specific elements that are to replace or populate values for the set of test case specific properties in the test case base object may be represented or formatted in a human-readable or binary data file stored in a test data store that may be remote to the test agent. Additionally, optionally or alternatively, a set of test case common elements that is replace or popular values for some or all of test case common properties in the test case base object may also be represented or formatted in the same data file.

In some embodiments, the multiple sets of test case specific elements and/or the set of test case common elements may be formatted into a single record such as a single database record. Thus, in these embodiments, a test with the multiple test cases can be represented in the single database record with no additional records that are created and persisted. At runtime, the test agent clones the test case base object into the individual test case specific objects and replaces/populates the test case properties (e.g., the test case specific properties, the test case common properties, etc.). In some embodiments, the expanded specific test case objects may be used to execute corresponding test cases and stored. In some embodiments, the expanded/replaced values of the test case properties may be cached in memory for an iteration or execution of the requested test but are not kept after the iteration or execution of the requested test. This can simplify management of the test, as for example only a single spot such as the test agent is used to expand the test case base object into the test case specific objects and to replace/expand the values of the test case properties in the expanded test cases.

Example tests as described herein may include, but are not necessarily limited to only, those related to any of: production system functionality, system functionality in various stages of development and/or test phases, functionality related to user experiences, checking login pool, orchestration of multiple services, accesses to multiple data centers and/or data stores, system or service health checks, ping checks, transactions, account creation, reporting software, results analysis, alerting, visualization, multi-step tests, data creation tests, data deletion tests, data entry tests, complicated and/or uncomplicated transactions, services exposed to user systems, internal services not exposed to user systems, HTTP-based operations, UI related functionality, web-based accesses, SMTP-based operations, FTP-based operations, network functionality, real-time operations, near-real-time operations, non-real-time operations, and so forth.

3.0 Example Embodiments

Figure 4:
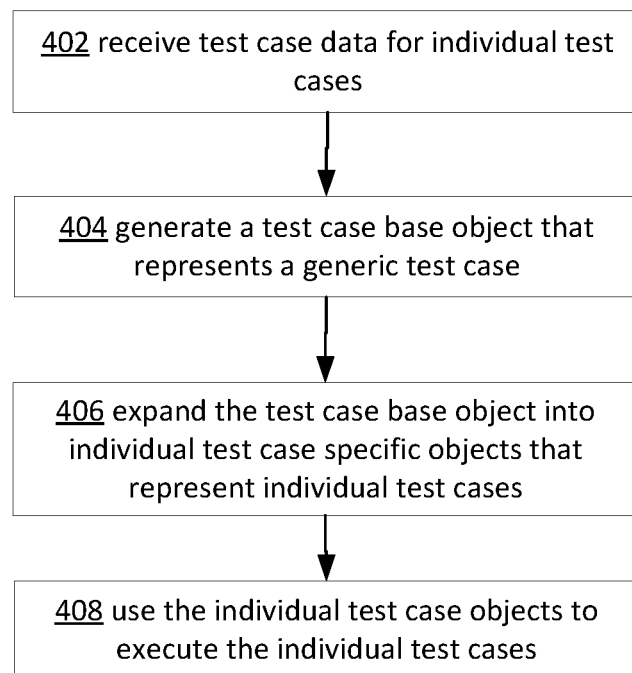
FIG. 4 illustrates an example process flow.

FIG. 4 illustrates an example process flow that may be implemented by a computing system (or device) as described herein. In block 402, a test execution engine (e.g., 124 of FIG. 1B, etc.) operating with a test agent (e.g., 118 of FIG. 1B, 118-1 through 118-N of FIG. 1A, etc.) receives test case data for a plurality of individual test cases, the test case data including a plurality of sets of test case specific elements.

In block 404, the test execution engine generates a test case base object that represents a generic test case, the test case base object including a set of test case specific properties.

In block 406, the test execution engine expands the test case base object into a plurality of individual test case specific objects that represents the plurality of individual test cases, each individual test case specific object in the plurality of individual test case specific objects being generated at least in part by setting the set of test case specific properties in each such individual test case specific object to a respective set of test case specific values as indicated in a respective set of test case specific elements in the plurality of sets of test case specific elements.

In block 408, the test execution engine uses the plurality of individual test case objects to execute the plurality of individual test cases against one or more systems under test, each individual test case object in the plurality of individual test case objects representing a respective test case in the plurality of test cases.

In an embodiment, the test case generic object implements at least a test execution method that is cloned by the plurality of individual test case specific objects; the test execution method, when invoked through the plurality of individual test case specific objects, performs same test checks across all test cases in the plurality of individual test cases.

In an embodiment, the plurality of sets of test case specific elements is represented as a plurality of sets of key-value pairs.

In an embodiment, the test case base object includes a set of test case common properties each of which is set with one of: a test case common element received with the set of test case common elements in a request for executing the plurality of test cases, a coded value used in constructing the test case base object, etc.

In an embodiment, the method as described herein is performed by a test agent; the test case data is generated by a test user interacting with a test master; the test case data is sent by the test master to the test agent, in a request for executing a test that includes the plurality of test cases.

In an embodiment, the plurality of test cases is used to test whether a plurality of applications or services in the one or more systems is performing correctly and responsively.

In an embodiment, the plurality of applications or services is accessed through different endpoints of one or more web servers in the one or more systems.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
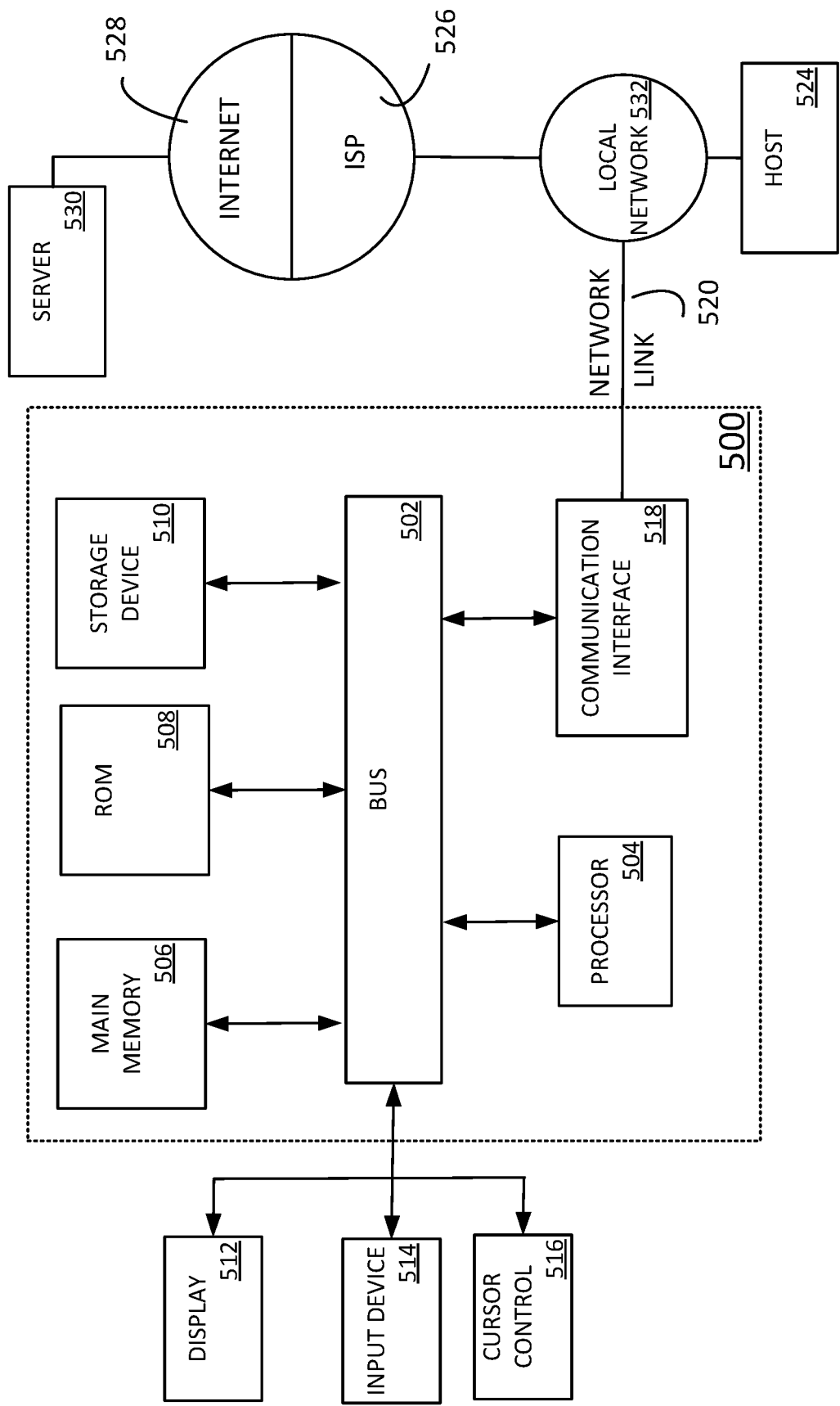
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving test case data, defined by a user, for a plurality of individual test cases, the test case data including a plurality of sets of test case specific elements;
   wherein the test case data identifies a set of dependent and independent test steps for each test case in the plurality of individual test cases;
   generating, based on the test case data as defined by the user, a test case base object that represents a generic test case, the test case base object including a set of test case specific properties to be populated by test case specific values;
   expanding the test case base object into a plurality of individual test case specific objects that represents the plurality of individual test cases, each individual test case specific object in the plurality of individual test case specific objects being generated at least in part by setting the set of test case specific properties in each such individual test case specific object to a respective set of test case specific values as indicated in a respective set of test case specific elements in the plurality of sets of test case specific elements;
   using the plurality of individual test case specific objects to execute the plurality of individual test cases against one or more systems under test, each individual test case specific object in the plurality of individual test case specific objects representing a respective test case in the plurality of test cases;
   wherein the test case generic object implements at least a test execution method, wherein the test execution method is cloned by the plurality of individual test case specific objects; and wherein the test execution method, when invoked through the plurality of individual test case specific objects, performs same test checks across all test cases in the plurality of individual test cases.

2. The method as recited in claim 1, wherein the plurality of sets of test case specific elements is represented as a plurality of sets of key-value pairs.

3. The method as recited in claim 1, wherein the test case base object includes a set of test case common properties each of which is set with one of: a test case common element received with the set of test case common elements in a request for executing the plurality of test cases, or a coded value used in constructing the test case base object.

4. The method as recited in claim 1, wherein the method is performed by a test agent, wherein the test case data is generated by a test user interacting with a test master, and wherein the test case data is sent by the test master to the test agent, in a request for executing a test that includes the plurality of test cases.

5. The method as recited in claim 1, wherein the plurality of test cases is used to test whether a plurality of applications in the one or more systems is performing correctly and responsively.

6. The method as recited in claim 1, wherein the plurality of applications is accessed through different endpoints of one or more web servers in the one or more systems.

7. One or more non-transitory computer readable media storing a program of instructions that is executable by a device to perform:
   receiving test case data, defined by a user, for a plurality of individual test cases, the test case data including a plurality of sets of test case specific elements;
   wherein the test case data identifies a set of dependent and independent test steps for each test case in the plurality of individual test cases;
   generating, based on the test case data as defined by a user, a test case base object that represents a generic test case, the test case base object including a set of test case specific properties to be populated by test case specific values;

expanding the test case base object into a plurality of individual test case specific objects that represents the plurality of individual test cases, each individual test case specific object in the plurality of individual test case specific objects being generated at least in part by setting the set of test case specific properties in each such individual test case specific object to a respective set of test case specific values as indicated in a respective set of test case specific elements in the plurality of sets of test case specific elements;

using the plurality of individual test case specific objects to execute the plurality of individual test cases against one or more systems under test, each individual test case specific object in the plurality of individual test case specific objects representing a respective test case in the plurality of test cases;

wherein the test case generic object implements at least a test execution method, wherein the test execution method is cloned by the plurality of individual test case specific objects; and wherein the test execution method, when invoked through the plurality of individual test case specific objects, performs same test checks across all test cases in the plurality of individual test cases.

8. The medium as recited in claim 7, wherein the plurality of sets of test case specific elements is represented as a plurality of sets of key-value pairs.

9. The medium as recited in claim 7, wherein the test case base object includes a set of test case common properties each of which is set with one of: a test case common element received with the set of test case common elements in a request for executing the plurality of test cases, or a coded value used in constructing the test case base object.

10. The medium as recited in claim 7, wherein the test case data is generated by a test user interacting with a test master, and wherein the test case data is sent by the test master to a test agent, in a request for executing a test that includes the plurality of test cases.

11. The medium as recited in claim 7, wherein the plurality of test cases is used to test whether a plurality of applications in the one or more systems is performing correctly and responsively.

12. The medium as recited in claim 7, wherein the plurality of applications is accessed through different endpoints of one or more web servers in the one or more systems.

13. A system, comprising:
one or more computing processors;
one or more non-transitory computer readable media storing a program of instructions that is executable by the one or more computing processors to perform:
receiving test case data, as defined by a user, for a plurality of individual test cases, the test case data including a plurality of sets of test case specific elements;
wherein the test case data identifies a set of dependent and independent test steps for each test case in the plurality of individual test cases;
generating, based on the test case data as defined by the user, a test case base object that represents a generic test case, the test case base object including a set of test case specific properties to be populated by test case specific values;
expanding the test case base object into a plurality of individual test case specific objects that represents the plurality of individual test cases, each individual test case specific object in the plurality of individual test case specific objects being generated at least in part by setting the set of test case specific properties in each such individual test case specific object to a respective set of test case specific values as indicated in a respective set of test case specific elements in the plurality of sets of test case specific elements;
using the plurality of individual test case specific objects to execute the plurality of individual test cases against one or more systems under test, each individual test case specific object in the plurality of individual test case specific objects representing a respective test case in the plurality of test cases;
wherein the test case generic object implements at least a test execution method, wherein the test execution method is cloned by the plurality of individual test case specific objects; and wherein the test execution method, when invoked through the plurality of individual test case specific objects, performs same test checks across all test cases in the plurality of individual test cases.

14. The system as recited in claim 13, wherein the plurality of sets of test case specific elements is represented as a plurality of sets of key-value pairs.

15. The system as recited in claim 13, wherein the test case base object includes a set of test case common properties each of which is set with one of: a test case common element received with the set of test case common elements in a request for executing the plurality of test cases, or a coded value used in constructing the test case base object.

16. The system as recited in claim 13, wherein the test case data is generated by a test user interacting with a test master, and wherein the test case data is sent by the test master to a test agent, in a request for executing a test that includes the plurality of test cases.

17. The system as recited in claim 13, wherein the plurality of test cases is used to test whether a plurality of applications in the one or more systems is performing correctly and responsively.

18. The system as recited in claim 13, wherein the plurality of applications is accessed through different endpoints of one or more web servers in the one or more systems.

* * * * *